(12) United States Patent
Way et al.

(10) Patent No.: US 11,822,576 B2
(45) Date of Patent: Nov. 21, 2023

(54) DATABASE MANAGEMENT FOR DIGITALLY STORING ITEM INFORMATION

(71) Applicant: Capital One Services, LLC, McLean, VA (US)

(72) Inventors: Brendan Way, Brooklyn, NY (US); Tyler Maiman, Melville, NY (US); Abdelkader M'Hamed Benkreira, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/443,482

(22) Filed: Jul. 27, 2021

(65) Prior Publication Data

US 2023/0037216 A1   Feb. 2, 2023

(51) Int. Cl.
*G06F 16/00* (2019.01)
*G06F 16/28* (2019.01)
*G06F 16/22* (2019.01)

(52) U.S. Cl.
CPC ............ *G06F 16/284* (2019.01); *G06F 16/22* (2019.01)

(58) Field of Classification Search
CPC ................................ G06F 16/284; G06F 16/22
See application file for complete search history.

(56) References Cited

U.S. PATENT DOCUMENTS

| | | | |
|---|---|---|---|
| 10,650,358 B1 | 5/2020 | Edwards et al. | |
| 10,684,738 B1 * | 6/2020 | Sicora | G06F 16/435 |
| 2012/0130778 A1 * | 5/2012 | Cotton | G06F 16/22 |
| | | | 705/14.1 |
| 2016/0217532 A1 * | 7/2016 | Slavin | G06Q 30/0276 |
| 2017/0011460 A1 * | 1/2017 | Molinari | G06Q 40/06 |
| 2017/0048230 A1 * | 2/2017 | Johansson | H04L 63/083 |
| 2017/0300872 A1 * | 10/2017 | Brown | G06Q 40/12 |
| 2017/0352012 A1 * | 12/2017 | Hearn | G06Q 20/382 |
| 2018/0165598 A1 * | 6/2018 | Saxena | G06N 5/04 |
| 2018/0225640 A1 * | 8/2018 | Chapman | G06Q 20/401 |
| 2018/0225660 A1 * | 8/2018 | Chapman | G06Q 20/3829 |
| 2018/0308134 A1 * | 10/2018 | Manning | G06Q 30/08 |
| 2019/0026821 A1 * | 1/2019 | Bathen | G06Q 40/00 |

(Continued)

OTHER PUBLICATIONS

Radha, R. "A Survey on Resale of Automobiles Using Emerging Technology: Blockchain." (May 2021), International Journal of Computer Science and Mobile Computing, vol. 10, Issue. 5, p. 67-71 (Year: 2021).*

*Primary Examiner* — Polina G Peach
(74) *Attorney, Agent, or Firm* — Harrity & Harrity, LLP

(57) ABSTRACT

In some implementations, a device may receive an indication of an item associated with a user and a first entity and may store information associated with the item in a first entry of a first database associated with the user. The device may identify a second entry in a second database associated with the first entity. The second entry may identify one or more documents associated with the item, and the second database may identify documents for a second set of items associated with the first entity. The device may map the first entry to the second entry to enable the one or more documents associated with the item to be associated with the first entry of the first database associated with the user. The device may transmit an indication of at least one document of the one or more documents.

20 Claims, 7 Drawing Sheets

(56) References Cited

U.S. PATENT DOCUMENTS

| | | | |
|---|---|---|---|
| 2019/0034975 A1* | 1/2019 | Rizk | G06F 3/0482 |
| 2019/0130416 A1* | 5/2019 | Boudville | G06Q 20/1085 |
| 2019/0220831 A1* | 7/2019 | Rangarajan | H04L 9/3239 |
| 2019/0222418 A1* | 7/2019 | O'Brien | H04L 9/0637 |
| 2019/0251527 A1* | 8/2019 | Surdak | G06Q 20/3674 |
| 2019/0266568 A1* | 8/2019 | O'Brien | G06Q 10/08355 |
| 2019/0266613 A1* | 8/2019 | Cantrell | G06Q 30/0185 |
| 2019/0385215 A1* | 12/2019 | Ferenczi | G06Q 20/12 |
| 2020/0074461 A1* | 3/2020 | Derosa-Grund | G06F 21/645 |
| 2020/0186962 A1* | 6/2020 | Moeller | H04L 9/3226 |
| 2020/0210413 A1* | 7/2020 | Quick | G06Q 20/223 |
| 2020/0242595 A1* | 7/2020 | Harrison | H04L 67/1097 |
| 2020/0250683 A1* | 8/2020 | Padmanabhan | G06Q 20/38215 |
| 2020/0265530 A1* | 8/2020 | Lee | G06Q 50/184 |
| 2020/0267163 A1* | 8/2020 | Wilson | G06F 16/907 |
| 2021/0042803 A1* | 2/2021 | Achkir | G06K 7/1413 |
| 2021/0150539 A1* | 5/2021 | Yau | G06Q 30/0208 |
| 2022/0066424 A1* | 3/2022 | Jahunnathan | G05B 19/4185 |
| 2022/0123945 A1* | 4/2022 | Yang | H04L 9/3247 |
| 2022/0147988 A1* | 5/2022 | Alexa | G06Q 20/3825 |
| 2022/0171876 A1* | 6/2022 | Pratt | G06F 21/6245 |
| 2022/0253844 A1* | 8/2022 | Patel | G06Q 20/3829 |
| 2022/0270087 A1* | 8/2022 | Kim | H04L 67/12 |

\* cited by examiner

DATABASE MANAGEMENT FOR DIGITALLY STORING ITEM INFORMATION

BACKGROUND

Data storage, such as a database, a table, and/or a linked list, among other examples, is an organized collection of data. A relational database is a collection of schemas, tables, queries, reports, and/or views, among other examples. Data storage designers typically organize the data storage to model aspects of reality in a way that supports processes requiring information. A data storage management system is a software application that interacts with users, other applications, and data storage to allow definition, creation, querying, update, and/or administration of data storage.

One type of data storage is a blockchain. A blockchain is a continuously growing list of records, called blocks, which are linked and secured using cryptography. Each block may contain a hash pointer as a link to a previous block, a timestamp, and transactional data (e.g., each block may include many transactions). By design, a blockchain is inherently resistant to modification of the transactional data. A blockchain may be managed by a peer-to-peer network of nodes (e.g., devices) collectively adhering to a consensus protocol for validating new blocks. Once recorded, the transaction data in a given block cannot be altered retroactively without the alteration of all previous blocks, which requires collusion of a majority of the network nodes. A blockchain is an append-only data structure maintained by a network of nodes that do not fully trust each other. A permissioned blockchain is a type of blockchain where access to the network of nodes is controlled in some manner (e.g., by a central authority and/or other nodes of the network). All nodes in a blockchain network agree on an ordered set of blocks, and each block may contain one or more transactions. Thus, a blockchain may be viewed as a log of ordered transactions.

SUMMARY

Some implementations described herein relate to a system for database management for digitally storing item information. The system may include one or more memories and one or more processors coupled to the one or more memories. The one or more processors may be configured to receive an indication of an exchange associated with a user and a first entity. The one or more processors may be configured to store information associated with the exchange in a first block of a first blockchain associated with the user, wherein the first blockchain identifies information for a plurality of exchanges associated with the user. The one or more processors may be configured to determine a second entity associated with the exchange and an item associated with the exchange based at least in part on exchange information associated with the exchange. The one or more processors may be configured to identify a second block in a second blockchain associated with the second entity, wherein the second block identifies the item information associated with the item, and wherein the second blockchain identifies information for a plurality of items associated with the second entity. The one or more processors may be configured to map the first block to the second block to enable the item information associated with the item to be associated with the exchange. The one or more processors may be configured to transmit, to a device associated with the user, an indication of the item information based at least in part on detecting an event associated with the item.

Some implementations described herein relate to a method for database management for digitally storing item information. The method may include receiving, by a device, an indication of an item associated with a user and a first entity. The method may include storing, by the device, information associated with the item in a first entry of a first database associated with the user, wherein the first database identifies information for a first set of items associated with the user. The method may include identifying, by the device, a second entry in a second database associated with the first entity, wherein the second entry identifies one or more documents associated with the item, and wherein the second database identifies documents for a second set of items associated with the first entity. The method may include mapping, by the device, the first entry to the second entry to enable the one or more documents associated with the item to be associated with the first entry of the first database associated with the user. The method may include transmitting, by the device, an indication of at least one document of the one or more documents based at least in part on detecting an event associated with the item.

Some implementations described herein relate to a non-transitory computer-readable medium that stores a set of instructions for a device. The set of instructions, when executed by one or more processors of the device, may cause the device to receive an indication of an exchange associated with a user and a first entity. The set of instructions, when executed by one or more processors of the device, may cause the device to determine at least one of a second entity associated with the exchange or an item associated with the exchange based at least in part on exchange information associated with the exchange. The set of instructions, when executed by one or more processors of the device, may cause the device to store information associated with the item in a first entry of a first database associated with the user, wherein the first database identifies information for a first set of items associated with the user. The set of instructions, when executed by one or more processors of the device, may cause the device to identify a second entry in a second database associated with the second entity, wherein the second entry identifies one or more documents associated with the item, and wherein the second database identifies documents for a second set of items associated with the second entity. The set of instructions, when executed by one or more processors of the device, may cause the device to map the first entry to the second entry to enable the one or more documents associated with the item to be associated with the first database associated with the user. The set of instructions, when executed by one or more processors of the device, may cause the device to transmit an indication of at least one document of the one or more documents based at least in part on detecting an event associated with the item.

DETAILED DESCRIPTION

Figure 1A:
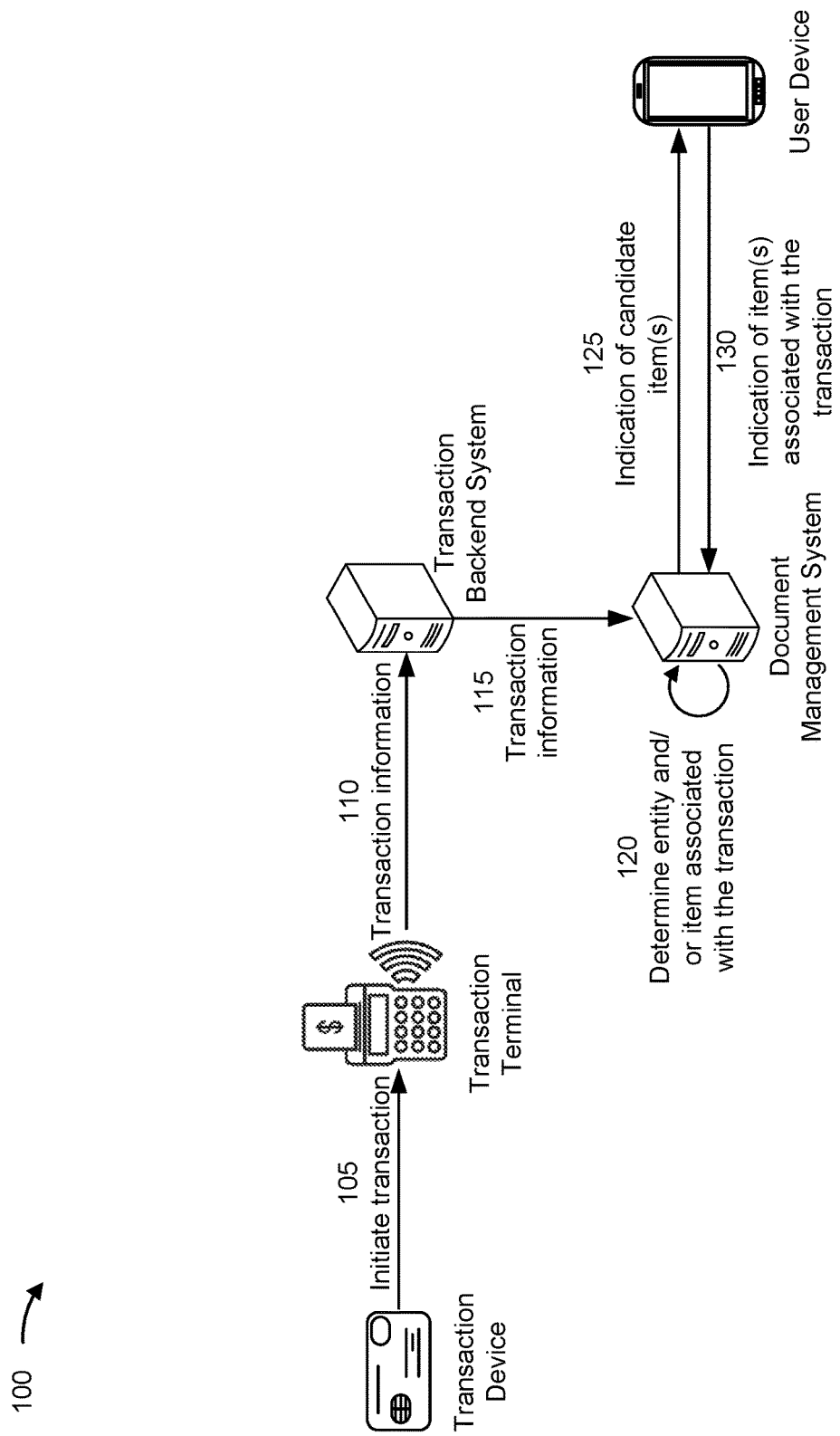
FIGS. 1A-1C are diagrams of an example implementation relating to database management for digitally storing item information.

The following detailed description of example implementations refers to the accompanying drawings. The same reference numbers in different drawings may identify the same or similar elements.

Typically, an item is sold by a third party retailer or merchant (e.g., an entity that does not actually produce or manufacture the item). For example, the entity that makes or manufactures the item (e.g., a producing entity or a brand) may distribute the item to multiple third party retailers to sell the item to consumers (e.g., users). However, there is a disconnect between the users and the producing entity because the users purchase the item from the third party retailer, and not directly from the producing entity. Therefore, the producing entity may be unaware of, or may have a limited knowledge of, the users who are purchasing items produced by the producing entity. For example, a third party retailer may sell items from hundreds or thousands of different producing entities or brands. Data generated when an item is sold may include data for multiple producing entities or brands and/or may not include item-level data (e.g., the data may be generic to a transaction, rather than including data for the particular items purchased in the transaction). Therefore, obtaining data associated with, and enabling a producing entity to connect with, users who purchase items produced by a producing entity is difficult.

Moreover, items are often associated with item information. Item information may include information associated with an item, such as warranty information, return information, manual information (e.g., a user manual or an instruction manual), and/or insurance information. For example, when an item is purchased, the item may be associated with a warranty or insurance, and/or a return period (e.g., an amount of time during which the item may be returned). In some cases, the user may be asked to provide a copy of the receipt as proof of warranty and/or proof of whether the warranty is still in effect (e.g., the receipt may identify a date of purchase and/or a date on which the warranty went into effect). If the user does not have the receipt, the user might forget that the product is protected by the warranty, be unable to prove that the product is protected by the warranty, be unable to prove that the warranty is still in effect, and/or the like. When the user submits the claim that the promise of the warranty has not been fulfilled, and is unable to prove the claim, resources (e.g., processing resources, network resources, and/or memory resources) of a device used to submit the claim and/or a system used to process the claim are needlessly wasted by processing the claim for which there is no proof of warranty. Moreover, item information is often provided as a physical document (e.g., that is easily misplaced or lost) or is located at various, separate, online locations. This results in the item information being difficult to maintain and/or access for users.

Some implementations described herein provide a document management system associated with database management for digitally storing item information. For example, item information associated with an item may be digitized (e.g., stored digitally) to improve access to the item information. The document management system may maintain, or may access, multiple databases to link item information to items purchased by a particular user. For example, the document management system may maintain a user-specific database that tracks items purchased by a particular user. For example, the document management system may receive transaction or exchange data associated with a transaction. The document management system may determine and/or may receive an indication of an item associated with the transaction. The document management system may identify an entity (and/or a brand) associated with the item. The document management system may access an entity-specific database (e.g., a database associated with and/or managed by the entity associated with the item). The document management system may search the entity-specific database to identify information and/or entries associated with the item.

For example, an entry in the entity-specific database may include item information associated with the item. For example, the entry may include, or may identify, a warranty document, a manual or user guide document, return information, rebate information, and/or other item information or documents associated with the item. In some implementations, the entity may manage and/or may input information into the entity-specific database. For example, the entity may input or upload item information for multiple items produced, sold, and/or manufactured by the entity to the entity-specific database. Enabling the entity to manage and/or input information into the entity-specific database may improve access to item information and/or may reduce time and resources (e.g., processing resources, computing resources, and/or network resources) that would have otherwise been used when information is added to the entity-specific database and/or when information included in the entity-specific database is updated or modified. For example, the document management system may be enabled to quickly update users when a document identified by the entity-specific database is modified by the entity uploading or inputting the modified document (e.g., requiring only a single input or upload to the entity-specific database) and the document management system may notify the user that the document has been modified (e.g., rather than the entity being required to identify users who have purchased the item, identify contact information for the users, and/or send the modified document to each of the users).

In some implementations, the document management system may be enabled to determine items and/or entities associated with items from transaction data associated with a transaction at a third party retailer or merchant. For example, the document management system may maintain and/or access a merchant-specific database that identifies entities or brands that are sold by the third party retailer or merchant. The document management system may use transaction data and/or a machine learning model to identify the item(s) and/or entity associated with a transaction as a particular third party retailer or merchant. This may enable the document management system to link an item purchased by a user to item information associated with that item (e.g., from the entity-specific database), as described in more detail elsewhere herein.

In some implementations, the database(s) or data stores described herein may be blockchains. For example, the user-specific database may be a blockchain where each block in the blockchain identifies an item that the user has purchased and/or a transaction associated with the user. Similarly, the entity-specific database may be a blockchain where each block in the block chain identifies item information for a particular item. The document management system may map or link a block in the user-specific blockchain to a block in the entity-specific blockchain. For example, the document management system may map or link a block in the user-specific blockchain associated with an item to a block in the entity-specific blockchain that is associated with the item. Therefore, separate blockchains that may be managed by, or associated with, different parties that may be linked or may otherwise be associated with one another to improve access to the information stored by the blockchains. This may enable the document management system to quickly identify and/or associate an item purchased by a particular user to item information associated with that item.

In some implementations, the document management system may send notifications and/or updates associated with item information linked with an item purchased by a user to a device associated with the user. For example, the document management system may analyze and/or scrape documents associated with the item information to identify critical dates and/or information, such as a warranty expiration date, a return window (e.g., a period of time during which the item may be returned for a refund), rebate information and/or dates, and/or other dates associated with offers or contacts associated with the item. The document management system may use transaction data associated with the item (e.g., a transaction date) and the critical dates identified by the document management system to transmit updates or notifications to the device associated with the user. This may alert the user of upcoming or approaching critical dates and enable the user to take an action (if necessary) associated with a document, contract, or offer associated with the item. As a result, access to the item information may be improved as the user may have otherwise missed or forgotten about a critical date associated with the item.

In some implementations, the document management system may provide a mechanism to enable a user to access the item information associated with an item. For example, the document management system may provide a user interface and/or an application that enables a user to access item information associated with an item purchased by the user. For example, the document management system may obtain item information stored by an entity-specific data store (e.g., that is linked or mapped to an entry or block in a user-specific data store). The document management system may enable a user to access the item information via a user interface and/or an application executing on a user device. This may improve access to the item information and/or may conserve resources that would have otherwise been used to enable the user to access the item information. For example, the document management system may be enabled to quickly identify, obtain, and/or provide the item information via interacting with the user-specific database (or blockchain) and/or the entity-specific database (or blockchain) to enable a user to access item information associated with an item purchased by the user. This may conserve resources (e.g., network resources, computing resources, and/or memory resources) that would have otherwise been used by the user to search for, access, download, and/or otherwise obtain the item information and/or that would have otherwise been used by the entity to identify user(s) who have purchased the item, identify contact information for the user(s), and/or provide the item information to the identified user(s) who have purchased the item.

Figure 1B:
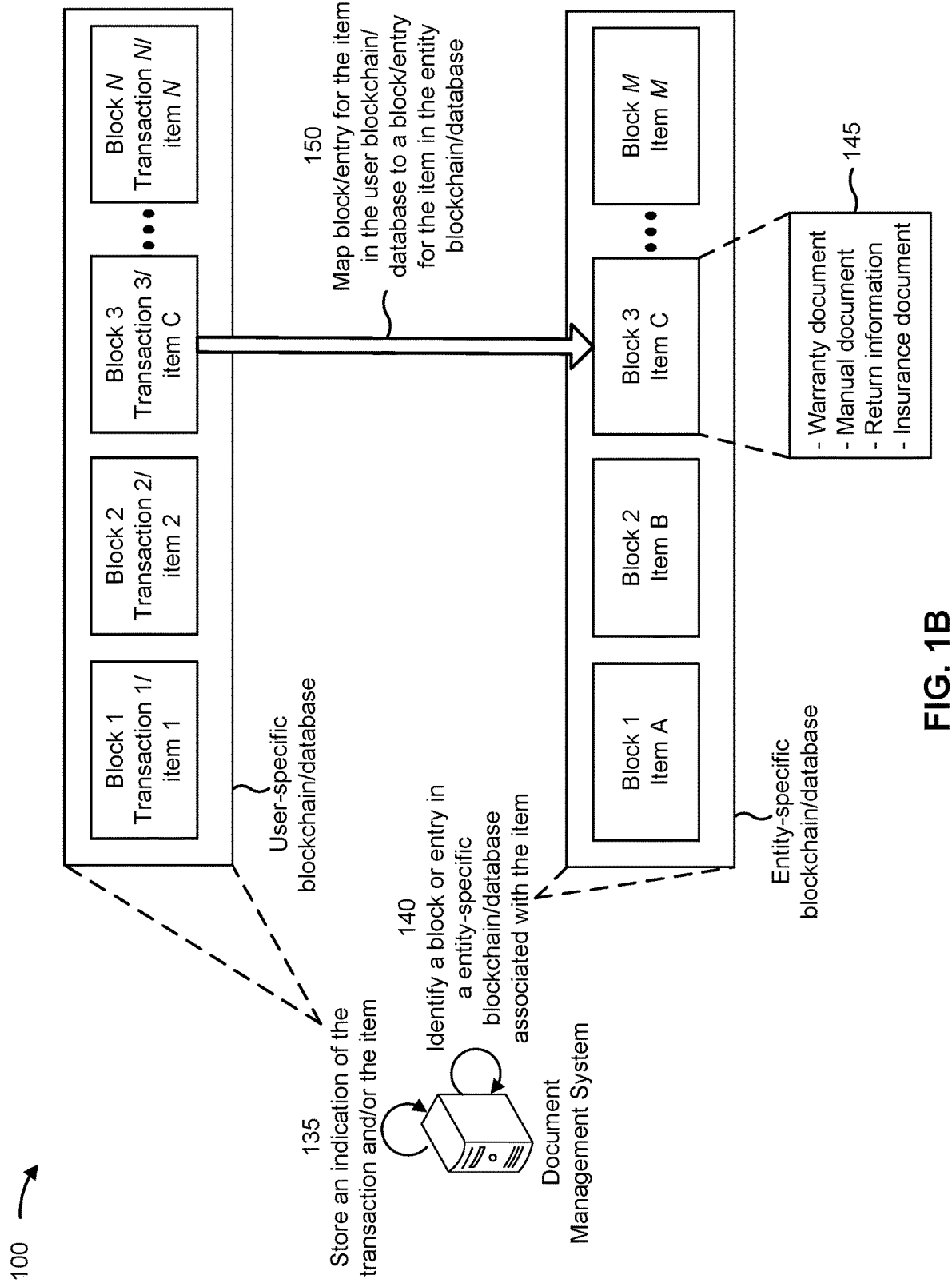
Figure 1C:
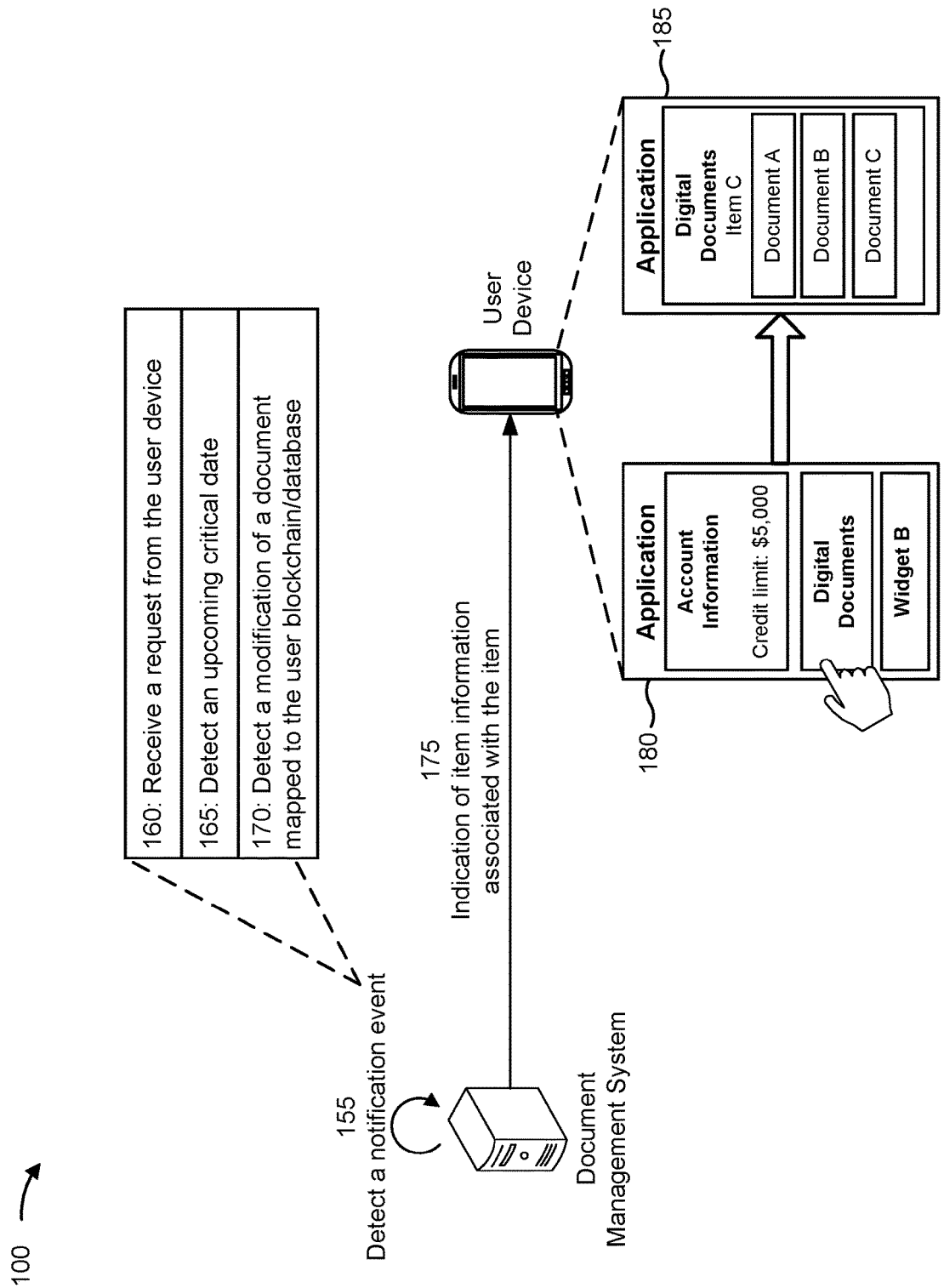

FIGS. 1A-1C are diagrams of an example 100 associated with database management for digitally storing item information. As shown in FIGS. 1A-1C, example 100 includes a transaction device, a transaction terminal, a transaction backend system, a document management system, and/or a user device, among other examples. These devices may interact and/or communicate with one another to provide transaction or exchange information, item information, and/ or to otherwise enable database management for digitally storing item information, as explained in more detail elsewhere herein. These devices are described in more detail in connection with FIGS. 3 and 4.

As shown in FIG. 1A, a user may initiate a transaction with a seller (e.g., a vendor, a merchant, a third party entity, or another entity). As used herein, "exchange" may refer to a transaction, an event, an electronic exchange, a sale, an account event, and/or a transfer, among other examples. "Transaction" and "exchange" may be used interchangeably herein. As shown by reference number 105, the transaction device may communicate with, or interact with, the transaction terminal to initiate the transaction. For example, in some implementations, the user may present the transaction device at the transaction terminal of the seller. In some implementations, the transaction terminal may receive an indication of an identifier of the transaction device. For example, the user may input the identifier of the transaction device to the transaction terminal. In some implementations, such as in an online transaction, the transaction terminal may be a page or application executing on a user device and the user may input the identifier of the transaction device to the page or application.

As shown by reference number 110, the transaction terminal may transmit, and the transaction backend system may receive, transaction information associated with the transaction. The transaction information may include an amount, a location, a time, an identifier of the transaction, and/or an identifier of the entity, among other examples. Additionally, the transaction terminal may transmit an indication of the identifier associated with the transaction device.

As shown by reference number 115, the transaction backend system may transmit, and the document management system (or another device associated with the document management system) may receive, the transaction information associated with the transaction. In some implementations, the transaction backend system may request approval for the transaction. For example, the document management system may be associated with an institution (e.g., a financial institution, a bank, and/or a credit card company) that provided or that manages the transaction device and/or an account associated with the transaction device. Therefore, the transaction backend system may request approval from the document management system (or another device associated with the document management system and/or the institution) to complete the transaction. For example, the document management system (or another device associated with the document management system and/or the institution) may receive, from the transaction backend system associated with the seller, an indication of the transaction (e.g., of an event) that is associated with an account (e.g., and the transaction device) and the seller. In some implementations, the indication of the transaction may indicate an amount associated with the transaction.

In some implementations, the document management system (or another device associated with the document management system and/or the institution) may determine that the transaction may be completed. For example, the document management system (or another device associated with the document management system and/or the institution) may determine that the account associated with the transaction device is associated with sufficient resources (e.g., has a sufficient credit balance or account balance) to complete the transaction. Therefore, the document management system (or another device associated with the document management system and/or the institution) may transmit, and the transaction backend system may receive, an indication that the transaction is approved. The transaction backend system may proceed with processing and completing the transaction.

As shown by reference number 120, the document management system may determine an entity and/or one or more items associated with the transaction. In some implementations, the document management system may determine an entity (or brand) that manufactures or produces an item associated with the transaction. For example, the seller may be a third-party retailer or merchant that sells items manufactured or produced by multiple entities (e.g., tens, hundred, or thousands of entities). Therefore, the document management system may need to identify an entity associated with an item to enable the document management system to identify item information for the item, as described in more detail elsewhere herein. In some implementations, the transaction information may identify one or more entities associated with the transaction. However, in some other implementations, the transaction information may not identify entities associated with the transaction (e.g., the transaction information may be at a transaction level only and may not identify details or information associated with particular items associated with the transaction). Therefore, in some implementations, the document management system may determine one or more entities associated with the transaction (e.g., based on the transaction information and/or other information).

For example, the document management system may determine one or more entities associated with the transaction using the transaction information. In some implementations, the document management system may determine a category associated with the transaction. For example, a category may be electronics, furniture, food, home goods, tools, and/or another category that identifies a type of item associated with the transaction. The document management system may use the category to identify a set of possible entities associated with the transaction (e.g., an entity that produces only food products may not be considered by the document management system if the determined category is electronics). This may conserve resources that would have otherwise been used processing and/or determining the entity and/or item(s) associated with the transaction using all potential entities that sell items at the seller location.

In some implementations, the document management system may determine the category and/or an entity associated with the transaction using an amount associated with the transaction, a list or database of entities that sell items at the seller, a date associated with the transaction, a time associated with the transaction, a location associated with the transaction, historical transaction(s) associated with the user, a payment medium associated with the transaction, and/or user information associated with the user, among other examples. For example, an amount associated with the transaction may indicate a category associated with the transaction (e.g., a higher amount may indicate that the transaction is associated with larger purchases, such as electronics, furniture, or other categories; whereas a smaller amount may indicate that the transaction is associated with smaller purchases, such as food, home goods, or other categories). A date associated with the transaction may indicate a category associated with the transaction. For example, a transaction date (e.g., an exchange date) near a sale event (such as a "black Friday" sale event) may indicate that the category is electronics or other categories that are typically associated with discounted prices for the sale event. Additionally, certain items are more frequently purchased during certain times of the year (e.g., certain items are more often purchased in the summer months or winter months). Therefore, the transaction date may be an indicator of the item and/or a category associated with the transaction.

As another example, the document management system may identify historical transactions associated with the user to determine the entity, item, and/or category associated with the transaction. For example, the document management system may identify one or more previous transactions completed by the user. In some cases, an item or category of transaction of a historical transaction may indicate that the transaction is, or is not, associated with the item or category of the historical transaction. For example, if a user previously purchased a television (e.g., six months ago), the likelihood that the user is purchasing another television (e.g., six months later) may be reduced. As another example, if the user purchased a part for a car (e.g., one year ago), the likelihood that the user is purchasing the same part again (e.g., one year later) may be reduced (e.g., as the part may have an anticipated lifespan of more than one year). Therefore, historical transactions associated with the user may be used to determine the entity, item, and/or category associated with the transaction.

In some implementations, the document management system may determine candidate items and/or candidate categories associated with the transaction. For example, rather than determine a particular item or category associated with the transaction, the document management system (e.g., using one or more of the factors described herein) may determine one or more candidate items and/or one or more candidate categories associated with the transaction. A candidate item may be an item that has a likelihood (e.g., as determined by the document management system) of being included in the transaction (e.g., a percentage chance, or a likelihood score, of being included in the transaction that is above a threshold). Similarly, a candidate category may be a category that has a likelihood (e.g., as determined by the document management system) of being associated with the transaction.

In some implementations, the document management system may use a database associated with the seller to determine the entity, item, and/or category associated with the transaction. For example, the database may indicate or identify entities that are associated with the seller (e.g., entities that sell items at the seller store locations). For example, the document management system may search the database to identify potential entities (or candidate entities) that may be associated with the transaction. Using the database may conserve resources that would have otherwise been used determining the entity, item, and/or category associated with the transaction from a larger set of potential entities, because the database may narrow or reduce the number of potential entities that may be associated with the transaction, thereby reducing a computational complexity associated with determining the entity, item, and/or category associated with the transaction.

As shown by reference number 125, the document management system may transmit, and a user device associated with the user may receive, an indication of the candidate items and/or the candidate categories. For example, the document management system may transmit a notification to the user device to prompt the user to select a category and/or an item associated with the transaction from the candidate categories and/or the candidate items. This may conserve processing resources and/or computing resources that would have otherwise been used to determine a particular category and/or a particular item associated with the transaction.

Moreover, this may improve the accuracy of the determination of the item, entity, and/or category associated with the transaction, as the user is enabled to select the actual category and/or item(s) associated with the transaction (e.g., the user input may improve the accuracy of the determination as compared to a determination made the by document management system without any user input).

As shown by reference number 130, the user device may transmit, and the document management system may receive, an indication of one or more items, an entity, and/or a category associated with the transaction. For example, the user device may receive a user input (e.g., from the user) identifying one or more items (e.g., from a list of items, from candidate items provided by the document management system, and/or input by the user). The user device may transmit, to the document management system, an indication of the item(s) associated with the transaction. In some implementations, the document management system may determine the category and/or one or more entities associated with the transaction based on the indication of the item(s) associated with the transaction. In some implementations, the document management system may identify the item(s) associated with the transaction based only on the input provided by the user device (e.g., the document management system may not determine the entity and/or item(s) separately and may rely on the input provided by the user device to determine the item(s) associated with the transaction).

In some implementations, the document management system may use a machine learning model to determine the entity, item, and/or category associated with the transaction. For example, the document management system may input information to the machine learning model (e.g., may input information associated with one or more of the factors described herein) and the machine learning model may output information to enable the document management system to determine the entity, item, and/or category associated with the transaction. For example, the machine learning model may output a set of candidate items, a set of candidate entities, and/or a set of candidate categories associated with the transaction. In some implementations, the machine learning model may output a score indicating a likelihood that an entity, item, and/or category is associated with the transaction. The machine learning model is described in more detail herein in connection with FIG. 2.

As shown in FIG. 1B, and by reference number 135, the document management system may store information associated with the transaction, the item, the entity, and/or the category in a user-specific data store (e.g., a database or a blockchain that is associated with a particular user). As used herein, "data store" may refer to a database, a blockchain, and/or another data storage mechanism. For example, the document management system may create an entry or a block, in the user-specific data store, that is associated with the item purchased by the user. For example, as shown in FIG. 1B, the user-specific data store may include multiple entries or blocks (e.g., blocks 1 through N). Each block may be associated with an item and/or a transaction (e.g., a block may be associated with a single item or multiple items from the same transaction). In some implementations, as described above, the document management system may add a block to a blockchain associated with the user to track items purchased by the user. A blockchain may also be referred to as a distributed ledger and/or an immutable ledger. As the blockchain may be immutable (e.g., a block in the blockchain cannot be modified without modifying each previous block in the blockchain), storing the items purchased by the user in a blockchain may improve security of data associated with the user.

As shown by reference number 140, the document management system may identify a block or entry, in an entity-specific data store, that is associated with the item. For example, the document management system may determine the entity associated with the item (e.g., as described in more detail elsewhere herein). The document management system may identify a blockchain or a database associated with the entity. For example, the document management system may manage, or may have access to, one or more entity-specific blockchains or databases (e.g., with each data store being associated with a particular entity). For example, an entity may manage the data store associated with that entity. The entity-specific data store may identify item information associated with multiple items produced or manufactured by a particular entity. For example, as shown in FIG. 1B, the entity-specific data store may include multiple blocks or entries (e.g., blocks 1 through M). Each block or entry may be associated with a particular item (e.g., block 1 may be associated with item A, block 2 may be associated with item B, block 3 may be associated with item C, and so on). The entity may input, or upload, item information for particular items to the entity-specific data store. For example, the entity-specific blockchain may be hosted by, or maintained by, the institution that is associated with the document management system. The document management system may enable the entity to access the entity-specific data store and to provide information to be stored by the entity-specific data store. In this way, the entity may be enabled to provide item information, for a plurality of items manufactured or produced by the entity, to a single location to enable the item information to be distributed to and/or accessed by multiple users. Moreover, as the document management system may manage and/or have access to multiple entity-specific blockchains or databases, the document management system may be enabled to provide item information to a user for multiple entities, as described in more detail elsewhere herein.

"Item information" may refer to contracts, offers, rebates, promotional material, and/or other information associated with an item (e.g., that is provided by a producer or manufacturer of the item). For example, the item information associated with a particular item may include warranty information, manual or user guide information, return information, rebate information, and/or insurance information, among other examples. For example, the item information may include a warranty document, a manual document, an instruction guide document, a return information document, an insurance document, and/or a rebate document (or form), among other examples. The item information and/or documents may be stored in a digital form in the entity-specific data store. For example, as shown by reference number 145, a block associated with an item (e.g., item C) may store information for a warranty document for item C, a manual document for item C, return information for item C, and/or an insurance document for item C, among other examples. The entity that produces or manufactures item C may be enabled to upload, provide, change, remove, and/or modify item information or documents stored in the block (e.g., block 3) associated with item C. Therefore, the entity may be enabled to manage item information for multiple items produced or manufactured by the entity in a single location that enables the item information to be distributed to multiple users who have purchased the items, without the entity knowing, or having any information about, the users who have purchased the items.

The document management system may search the entity-specific data store for information associated with the item purchased by the user. For example, the item purchased by the user may be item C (e.g., shown in block 3 of the user-specific data store). The document management system may search the entity-specific data store (e.g., the data store that is associated with the entity that produces or manufactures item C) for information associated with item C. For example, the document management system may search the entity-specific data store using an identifier of item C (e.g., a code, a stock keeping unit (SKU) number, or another identifier). The document management system may search the entity-specific data store for an entry or a block that is associated with item C. For example, as shown in FIG. 1B, block 3 of the entity-specific data store may be associated with item C. In some implementations, if the entity-specific database does not include a block or entry associated with the item (e.g., item C) or if the document management system does not have access to an entity-specific data store associated with the entity that produces or manufactures the item, then the document management system may determine that digital item information cannot be linked or associated with the item. In such examples, the document management system may notify the user (e.g., by transmitting a message to the user device) that digital item information cannot be linked or associated with the item.

As shown by reference number 150, the document management system may map (or link) a block or entry in the user-specific data store to a block or entry in the entity-specific data store. For example, the document management system may map the block or entry, in the user-specific data store, associated with the item purchased by the user (e.g., block 3 of the user-specific data store) to a block or entry associated with the item in the entity-specific data store (e.g., block 3 of the entity-specific data store). In this way, the item block or entry associated with the item purchased by the user can be mapped or linked to item information associated with the item (e.g., that is provided by the entity that produced or manufactured the item). For example, by mapping the block or entry in the user-specific data store to the block or entry in the entity-specific data store, the document management system may quickly and easily identify and obtain the item information for the item associated with the block or entry in the user-specific data store.

The document management system may map or link the block or entry in the user-specific data store to the block or entry in the entity-specific data store by storing an identifier of the block or entry in the entity-specific data store in the block or entry in the user-specific data store. For example, the identifier may be a unique identifier, a hash pointer, a cryptographic hash of the block or entry in the entity-specific data store, and/or a digital signature of the block or entry in the entity-specific data store, among other examples. In this way, the document management system may quickly identify the block or entry in the entity-specific data store when the document management system needs to obtain item information for the item.

As shown in FIG. 1C, and by reference number 155, the document management system may detect a notification event associated with the item. "Notification event" may refer to an event, occurrence, or other trigger that indicates that the document management system is to transmit an indication of item information to the user device associated with the user. For example, as shown by reference number 160, a notification event may be the reception of a request for item information associated with an item. The user device may transmit, and the document management system may receive, a request for item information associated with an item. For example, the user device may transmit a request for a document (e.g., a warranty document, a user guide or manual document, an insurance document, and/or another document) associated with the item. For example, the user may input the request via an application (e.g., provided by or managed by the document management system) executing on the user device and/or via a webpage being displayed by the user device. For example, the user may input search terms to search for item information associated with an item previously purchased by the user. The search terms may include an entity name, an item name, an item type or category, and/or a transaction date, among other examples. When the user submits the search, a search request that includes the search terms may be provided to the document management system.

The document management system may identify item information based on the request received from the user device. For example, the document management system may identify an item associated with the request (e.g., based on the request and/or search terms associated with the request). The document management system may identify a block or entry in the user-specific data store that is associated with the item. The document management system may identify a block or entry in the entity-specific data store that is mapped or linked to the block or entry in the user-specific data store that is associated with the item (e.g., based on an indication included in the block or entry in the user-specific data store). The document management system may obtain item information from the block or entry in the entity-specific data store. For example, the document management system may obtain a document or other information (e.g., that is indicated by the request received from the user device) from the block or entry in the entity-specific data store that is associated with the item. The document management system may transmit, to the user device, an indication of the retrieved item information as described in more detail elsewhere herein (e.g., in connection with reference number 175).

In some implementations, as shown by reference number 165, the notification event may include detecting an upcoming critical date associated with a document or other item information for an item purchased by the user. For example, the document management system (e.g., after mapping or linking item information to a block or entry associated with an item purchased by the user) may analyze the item information to identify one or more critical dates associated with the item. A critical date may be associated an expiration of a contract (e.g., a warranty or insurance agreement associated with the item), a redeemable offer, and/or a rebate, among other examples, associated with the item. The document management system may analyze the item information to identify the one or more critical dates using a natural language processing technique or a text recognition technique to scrape or pull relevant dates from a document stored in the entity-specific data store. The document management system may determine a critical date based on dates scraped or pulled from a document and based on the transaction information associated with the transaction. For example, a warranty for an item may be valid for a period of time, beginning from the date the item is purchased. Therefore, the document management system may determine a critical date (e.g., a date on which the warranty for the item may expire) based on the period of time for which the warranty is valid and the transaction date associated with the item. Similarly, a rebate or other redeemable offer associated with the item may be valid until a certain date or for a period of time. The document management system may determine a critical date for the rebate or other redeemable offer in a similar manner as described above.

The document management system may notify or remind a user of an upcoming critical date associated with an item. For example, the document management system may determine to transmit a notification (reminder) of a critical date (e.g., to the user device associated with the user). The document management system may be configured with a rule or threshold value indicating when to provide the user with the reminder of the critical date. The notification or reminder of the critical date may include the critical date, a document or other item information associated with the critical date, and/or information needed to take action prior to the critical date (e.g., contact information needed to renew a warranty or redeem an offer, such as a phone number, e-mail address, and/or webpage), among other examples. In some implementations, the notification or reminder of the critical date may be based on a timer that, upon expiring or hitting a certain time, causes the document management system to determine to send the notification. As another example, the document management system may periodically check a current date and may determine whether the current date is within a threshold time period from the critical date. If the current date is within the threshold time period, the document management system may determine to transmit the notification.

In some implementations, as shown by reference number 170, the notification event may include detecting a modification of a document or other item information mapped to the user-specific data store. Additionally, or alternatively, the notification event may include detecting an addition of, or a removal of, document or information to a block or entry in the entity-specific data store that is mapped to the user-specific data store. For example, an entity may update or change a document associated with an item (e.g., a warranty document and/or a user guide or instruction manual). The entity may upload or input the updated or modified document to the block or entry in the entity-specific data store. As another example, an entity may issue a new offer associated with an item. The entity may upload or input information associated with the offer to the block or entry in the entity-specific data store. As another example, an entity may issue a notification or alert associated with an item. For example, the entity may issue a recall or other safety notification associated with an item. The entity may upload or input information associated with the notification or alert to the block or entry in the entity-specific data store.

The document management system may monitor the entity-specific data store to detect changes or modifications to information stored in the entity-specific data store. For example, the document management system may periodically check blocks or entries in the entity-specific data store to determine if information stored in the blocks or entries has changed from what was stored previously in the blocks or entries (e.g., if the entity associated with the entity-specific data store has added new information to the blocks or entries with the permission of a majority of network nodes, if the entity-specific data store is a blockchain). If the document management system determines that a block or entry includes new or modified information, then the document management system may determine whether the block or entry is mapped to, or linked with, a block or entry in the user-specific data store. If the document management system determines that the block or entry is mapped to, or linked with, a block or entry in the user-specific data store, then the document management system may determine that a notification should be transmitted to the user (e.g., to the user device). This may improve access to updates, changes, alerts, and/or recalls associated with item information for an item because the entity may only be required to upload item information associated with an item to the entity-specific data store and the information may be disseminated to users who have purchased the item by the document management system (e.g., without the entity needing to be aware of the users and/or contact information for the users).

As shown by reference number 175, the document management system may transmit an indication of item information associated with the item based on detecting a notification event, as described in more detail elsewhere herein. For example, the document management system may transmit the indication of the item information to the user device associated with the user (e.g., via an automated voice call, via a short message service (SMS) message, via an application executing on the user device, and/or via a push notification to the user device). As another example, the document management system may transmit the indication to an account associated with the user (e.g., an e-mail account or another account). As another example, the document management system may cause the indication to be transmitted via physical mail to an address associated with the user.

The indication of the item information may include a document or other item information (e.g., the document management system may enable the user device to download a document, such as a warranty document or a rebate offer), an indication of a critical date associated with the item information, an indication of the item associated with the item information, an indication of the entity associated with the item information, and/or information indicating actions that may be taken by the user associated with the item information (e.g., information on how to fulfill an offer or submit a claim, such as an address, a form, a webpage, and/or a uniform resource locater (URL)), among other examples.

In some implementations, the user may interact with an application or website executing on the user device to take an action associated with item information (e.g., to request to submit a claim under the terms of a warranty and/or to submit a claim for a rebate or offer). For example, the application may have an interface directed toward submitting or assisting in pursuing claims covered under the terms of a warranty. In this case, the user may use the search feature of the program or the website to permit the document management system to identify a receipt or other proof of purchase of the item. Additionally, the document management system may identify a manner in which the claim is to be submitted and may perform actions to submit the claim. For example, the document management system may automatically populate fields of a form that is provided via a webpage of an entity. In this case, the document management system may populate fields that ask for personal information of the user, information for the item, and/or proof of warranty or purchase (e.g., such as by uploading a receipt), among other examples.

For example, the document management system may identify user information associated with the user based on information provided to the document management system or based on an account of the user with the institution associated with the document management system. The document management system may receive, from the user device, a request to obtain a form associated with performing an action associated with item information. The document management system may automatically input the user information into one or more fields of the form based on receiving the request to obtain the form.

In some implementations, an entity may request that a form be submitted via another mode of communication, such as by mail, e-mail, and/or telephone, among other examples. In these cases, the document management system may perform one or more actions to submit the form or assist the user in submitting the form. As an example, if the form is to be submitted via telephone, the document management system may populate fields of a templated claim form, such that the user may read the claim form aloud during a telephone call. In some cases, such as when the form submission service is automated, the document management system may interact with a communication device (e.g., a mobile phone, a smart phone, etc.) to automatically select menu choices needed to submit the form. In the case where a form is to be submitted via mail, the document management system may populate fields of the form and provide the form (e.g., with the populated fields) to the user device to enable the user device to download and print a copy of the form.

As shown by reference number 180, the user may be enabled to access and view item information for items purchased by the user via an application executing on the user device. The application may be associated with the document management system and/or an institution associated with the document management system. For example, as shown in FIG. 1C, the application may be associated with an account of the user (e.g., a credit account). The application may enable the user to access account information in addition to the item information. As shown in FIG. 1C, the application may include on or more components or software widgets associated with different functions provided by the application. For example, the application may include a software widget for accessing account information and a software widget for accessing digital documents (e.g., item information for items purchased by the user).

As shown in FIG. 1C, the user may provide an input to select an option to view and/or access item information associated with items purchased by the user (e.g., by selecting the "digital documents" option shown in FIG. 1C). As shown by reference number 185, the application may cause the user device to display different item information or documents associated with an item purchased by the user. For example, the application may cause the user device to enable documents (e.g., document A, document, B, and document C) associated with the item C purchased by the user to be downloaded and/or displayed by the user device. For example, the documents (e.g., document A, document, B, and document C) may be documents stored in the block or entry in the entity-specific data store associated with the item C. The user device may be enabled to download and/or display the documents based on an input via the application (e.g., the user device may be enabled to download and/or display document A based on a user input selecting the option for document A). Additionally, the application may offer one or more other functions (not shown in FIG. 1C) associated with item information for an item, such as submitting a warranty claim, renewing a warranty, and/or submitting an offer or rebate form, among other examples.

In some implementations, the user may sell or otherwise transfer ownership of an item purchased by the user. For example, the user may sell the item C (e.g., that is associated with the block or entry in the user-specific data store) to a second user (e.g., a different user). In some cases, the document management system and/or the entity associated with item C may be unaware of the transfer of item C to the second user (e.g., because the transfer is a third party transfer that may not be associated with the entity, or a seller and/or the second user may not have an account with the institution associated with the document management system). In some implementations, to enable the document management system to provide digital documents and item information associated with item C to the second user, the user may provide an indication of the transfer of item C to the document management system. For example, the user device may transmit, and the document management system may receive, an indication of the transfer of item C to the second user. The indication of the transfer may include an indication of the second user (e.g., an identifier of the second user, a phone number of the second user, an e-mail of the second user, and/or an account identifier of the second user). The document management system may determine whether the second user has an account associated with the document management system and/or the institution associated with the document management system. If the document management system determines that the second user does not have an account, then the document management system may prompt or request the second user (e.g., by transmitting a message to a device associated with the second user or to an account associated with the second user, such as an e-mail account) to create an account associated with the document management system.

If the document management system determines that the second user does have an account (or after the second user has created an account) with the document management system, then the document management system may create a block or entry in a user-specific data store associated with the second user for the item that was transferred to the second user (e.g., item C). For example, the document management system may track the item in the user-specific data store associated with the second user in a similar manner as described elsewhere herein. Additionally, the document management system may map or link the block or entry in the user-specific data store to the block or entry in the entity-specific data store that is associated with the item that was transferred to the second user (e.g., item C), in a similar manner as described elsewhere herein. In this way, the document management system may ensure that third party purchasers or owners of items are enabled to have access to item information associated with items. Additionally, the document management system improves access for entities to the actual owners of items manufactured or produced by the entities, even when an item is transferred to a second user after an initial purchase.

As indicated above, FIGS. 1A-1C are provided as an example. Other examples may differ from what is described with regard to FIGS. 1A-1C.

Figure 2:
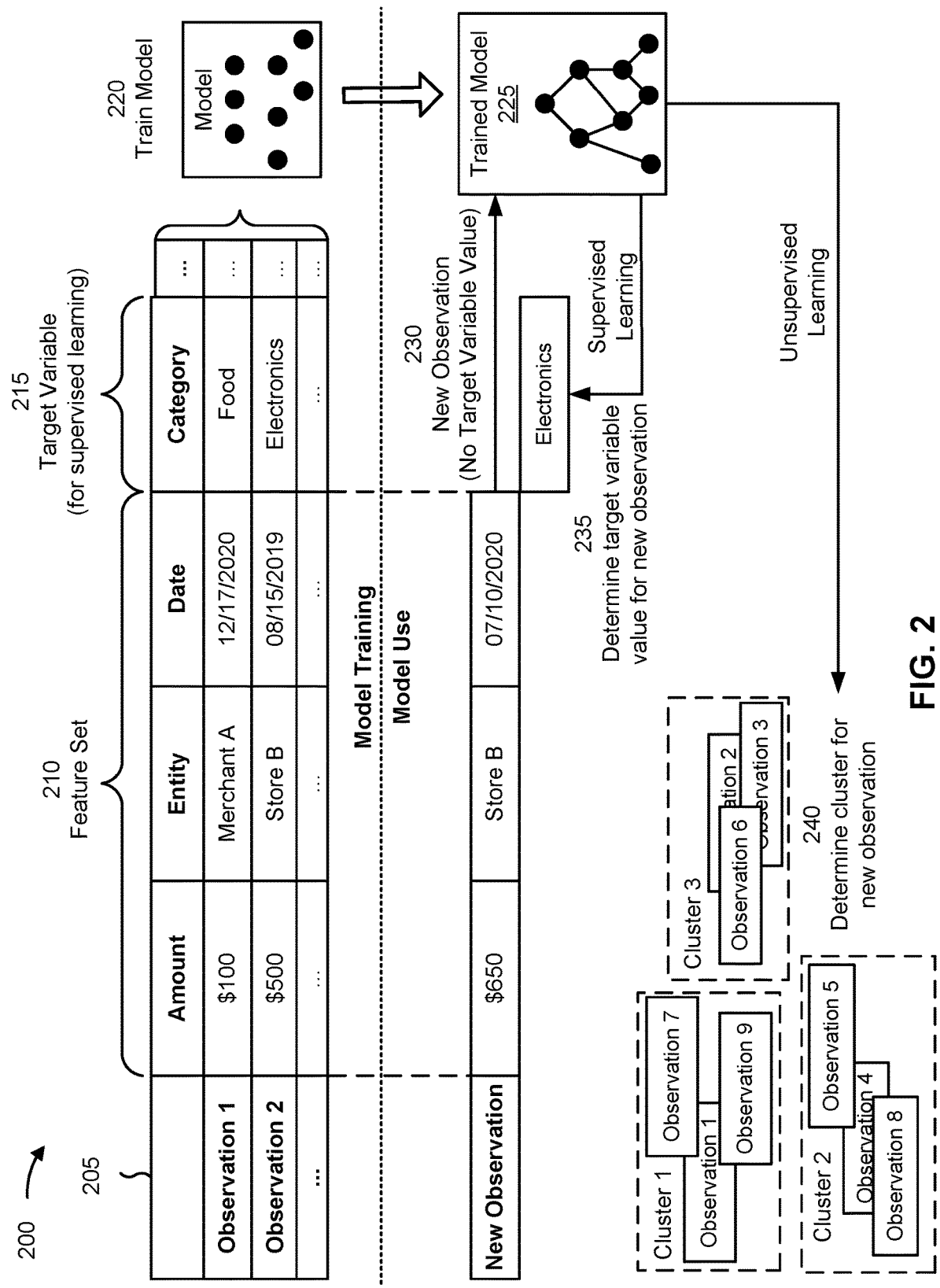
FIG. 2 is a diagram illustrating an example of training and using a machine learning model in connection with database management for digitally storing item information.

FIG. 2 is a diagram illustrating an example 200 of training and using a machine learning model in connection with database management for digitally storing item information. The machine learning model training and usage described herein may be performed using a machine learning system. The machine learning system may include or may be included in a computing device, a server, a cloud computing environment, or the like, such as the document management system, and/or the user device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the document management system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from document management system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of amount (e.g., transaction amount), a second feature of entity, a third feature of date (e.g., transaction date), and so on. As shown, for a first observation, the first feature may have a value of $100, the second feature may have a value of "Merchant A", the third feature may have a value of Dec. 17, 2020, and so on. These features and feature values are provided as examples, and may differ in other examples. For example, the feature set may include one or more of the following features: a time associated with a transaction, a location associated with the transaction, a seller associated with the transaction, one or more entities associated with items purchased in the transaction, historical transaction information associated with the user, a payment medium associated with the transaction (e.g., cash vs. credit, online vs. in-person), user information associated with the user (e.g., credit score, user demographics, gender, and/or age), and/or other transaction information.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, or labels) and/or may represent a variable having a Boolean value. A target variable may be associated with a target variable value, and a target variable value may be specific to an observation. In example 200, the target variable is "category", which has a value of "food" for the first observation.

The feature set and target variable described above are provided as examples, and other examples may differ from what is described above. For example, the target variable may be an item associated with the transaction, an entity associated with the transaction, and/or a likelihood score that an item or entity is associated with a transaction (e.g., where a higher score indicates a higher likelihood that the item/entity is associated with the transaction), among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of amount (e.g., transaction amount), a second feature of entity, a third feature of date (e.g., transaction date), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "electronics" for the target variable of category for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a set of candidate entities and/or a set of candidate items that may be associated with the transaction. The first automated action may include, for example, transmitting an indication of a set of candidate entities and/or a set of candidate items to a user device. As another example, a second automated action may include searching for an entity-specific data store associated with one or more entities identified by the machine learning model 225 (e.g., candidate entities).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., electronics), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action or the second automated action described above.

As another example, if the machine learning system were to classify the new observation in a second cluster (e.g., food), then the machine learning system may provide a second (e.g., different) recommendation (e.g., recommending a different set of candidate entities and/or a different set of candidate items that may be associated with the transaction) and/or may perform or cause performance of a second (e.g., different) automated action, such as transmitting an indication of the different set of candidate entities and/or the different set of candidate items to the user device.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to identifying entities and/or items associated with a transaction to enable database management for digitally storing item information. The machine learning system enables recognition and/or identification of tens, hundreds, thousands, or millions of features and/or feature values for tens, hundreds, thousands, or millions of observations, thereby increasing accuracy and consistency and reducing delay associated with identifying entities and/or items associated with a transaction to enable database management for digitally storing item information relative to requiring computing resources to be allocated for tens, hundreds, or thousands of operators to manually identifying entities and/or items associated with a transaction to enable database management for digitally storing item information using the features or feature values.

As indicated above, FIG. 2 is provided as an example. Other examples may differ from what is described in connection with FIG. 2.

Figure 3:
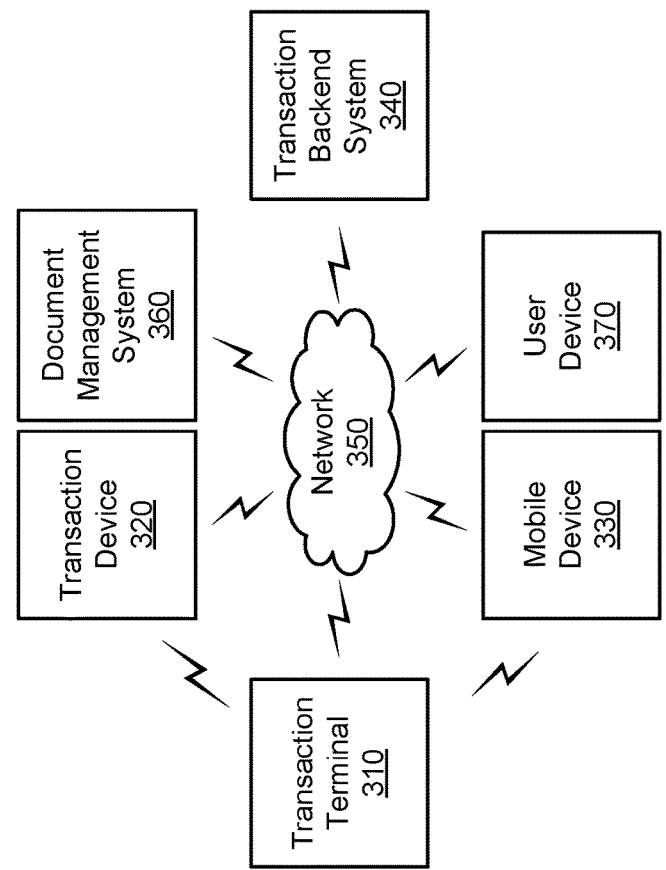
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a transaction terminal 310, a transaction device 320, a mobile device 330, a transaction backend system 340, a network 350, a document management system 360, and/or a user device 370. Devices of environment 300 may interconnect via wired connections and/or wireless connections.

The transaction terminal 310 includes one or more devices capable of facilitating an electronic transaction associated with the transaction device 320. For example, the transaction terminal 310 may include a point-of-sale (PoS) terminal, a payment terminal (e.g., a credit card terminal, a contactless payment terminal, a mobile credit card reader, or a chip reader), and/or an automated teller machine (ATM). The transaction terminal 310 may include one or more input components and/or one or more output components to facilitate obtaining data (e.g., account information) from the transaction device 320 and/or to facilitate interaction with and/or authorization from an owner or accountholder of the transaction device 320. Example input components of the transaction terminal 310 include a number keypad, a touchscreen, a magnetic stripe reader, a chip reader, and/or a radio frequency (RF) signal reader (e.g., a near-field communication (NFC) reader). Example output devices of transaction terminal 310 include a display and/or a speaker.

The transaction device 320 includes one or more devices capable of being used for an electronic transaction. In some implementations, the transaction device 320 includes a transaction card (or another physical medium with integrated circuitry) capable of storing and communicating account information, such as a credit card, a debit card, a gift card, an ATM card, a transit card, a fare card, and/or an access card. In some implementations, the transaction device 320 may be the mobile device 330 or may be integrated into the mobile device 330. For example, the mobile device 330 may execute an electronic payment application capable of performing functions of the transaction device 320 described herein. Thus, one or more operations described herein as being performed by the transaction device 320 may be performed by a transaction card, the mobile device 330, or a combination thereof.

The transaction device 320 may store account information associated with the transaction device 320, which may be used in connection with an electronic transaction facilitated by the transaction terminal 310. The account information may include, for example, an account identifier that identifies an account (e.g., a bank account or a credit account) associated with the transaction device 320 (e.g., an account number, a card number, a bank routing number, and/or a bank identifier), a cardholder identifier (e.g., identifying a name of a person, business, or entity associated with the account or the transaction device 320), expiration information (e.g., identifying an expiration month and/or an expiration year associated with the transaction device 320), and/or a credential (e.g., a payment token). In some implementations, the transaction device 320 may store the account information in tamper-resistant memory of the transaction device 320, such as in a secure element. As part of performing an electronic transaction, the transaction device 320 may transmit the account information to the transaction terminal 310 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 320 and the transaction terminal 310 may communicate with one another by coming into contact with one another (e.g., using a magnetic stripe or an EMV chip) or via contactless communication (e.g., using NFC).

The mobile device 330 includes one or more devices capable of being used for an electronic transaction, as described above in connection with the transaction device 320. The mobile device 330 may include a communication device and/or a computing device. For example, the mobile device 330 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the mobile device 330 may be capable of receiving, generating, storing, processing, and/or providing information associated with database management for digitally storing item information, as described elsewhere herein.

The transaction backend system 340 includes one or more devices capable of processing, authorizing, and/or facilitating a transaction. For example, the transaction backend system 340 may include one or more servers and/or computing hardware (e.g., in a cloud computing environment or separate from a cloud computing environment) configured to receive and/or store information associated with processing an electronic transaction. The transaction backend system 340 may process a transaction, such as to approve (e.g., permit, authorize, or the like) or decline (e.g., reject, deny, or the like) the transaction and/or to complete the transaction if the transaction is approved. The transaction backend system 340 may process the transaction based on information received from the transaction terminal 310, such as transaction data (e.g., information that identifies a transaction amount, a merchant, a time of a transaction, a location of the transaction, or the like), account information communicated to the transaction terminal 310 by the transaction device 320, and/or information stored by the transaction backend system 340 (e.g., for fraud detection).

The transaction backend system 340 may be associated with a financial institution (e.g., a bank, a lender, a credit card company, or a credit union) and/or may be associated with a transaction card association that authorizes a transaction and/or facilitates a transfer of funds. For example, the transaction backend system 340 may be associated with an issuing bank associated with the transaction device 320, an acquiring bank (or merchant bank) associated with the merchant and/or the transaction terminal 310, and/or a transaction card association (e.g., VISA® or MASTER-CARD®) associated with the transaction device 320. Based on receiving information associated with the transaction device 320 from the transaction terminal 310, one or more devices of the transaction backend system 340 may communicate to authorize a transaction and/or to transfer funds from an account associated with the transaction device 320 to an account of an entity (e.g., a merchant) associated with the transaction terminal 310.

The network 350 includes one or more wired and/or wireless networks. For example, the network 350 may include a cellular network, a public land mobile network, a local area network, a wide area network, a metropolitan area network, a telephone network, a private network, the Internet, and/or a combination of these or other types of networks. The network 350 enables communication among the devices of environment 300. In some implementations, the transaction terminal 310 may communicate with the transaction device 320 using a first network (e.g., a contactless network or by coming into contact with the transaction device 320) and may communicate with the transaction backend system 340 using a second network.

The document management system 360 includes one or more devices capable of receiving, generating, storing, processing, providing, and/or routing information associated with database management for digitally storing item information, as described elsewhere herein. The document management system 360 may include a communication device and/or a computing device. For example, the document management system 360 may include a server, such as an application server, a client server, a web server, a database server, a host server, a proxy server, a virtual server (e.g., executing on computing hardware), or a server in a cloud computing system. In some implementations, the document management system 360 includes computing hardware used in a cloud computing environment.

The user device 370 includes one or more devices capable of receiving, generating, storing, processing, and/or providing information associated with database management for digitally storing item information, as described elsewhere herein. The user device 370 may include a communication device and/or a computing device. For example, the user device 370 may include a wireless communication device, a mobile phone, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
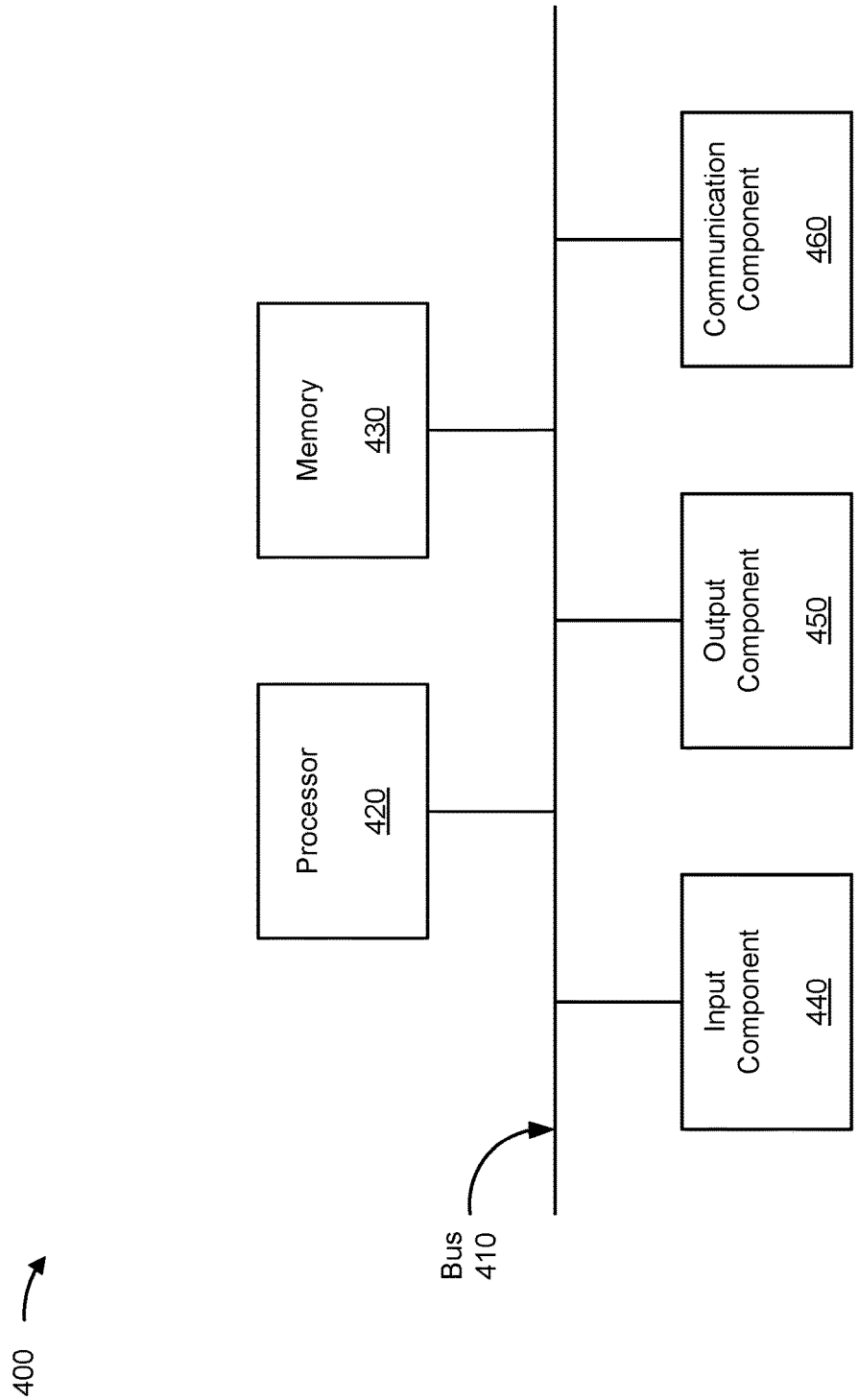
FIG. 4 is a diagram of example components of one or more devices of FIG. 3.

FIG. 4 is a diagram of example components of a device 400, which may correspond to the transaction terminal 310, the transaction device 320, the mobile device 330, the transaction backend system 340, the document management system 360, and/or the user device 370. In some implementations, the transaction terminal 310, the transaction device 320, the mobile device 330, the transaction backend system 340, the document management system 360, and/or the user device 370 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
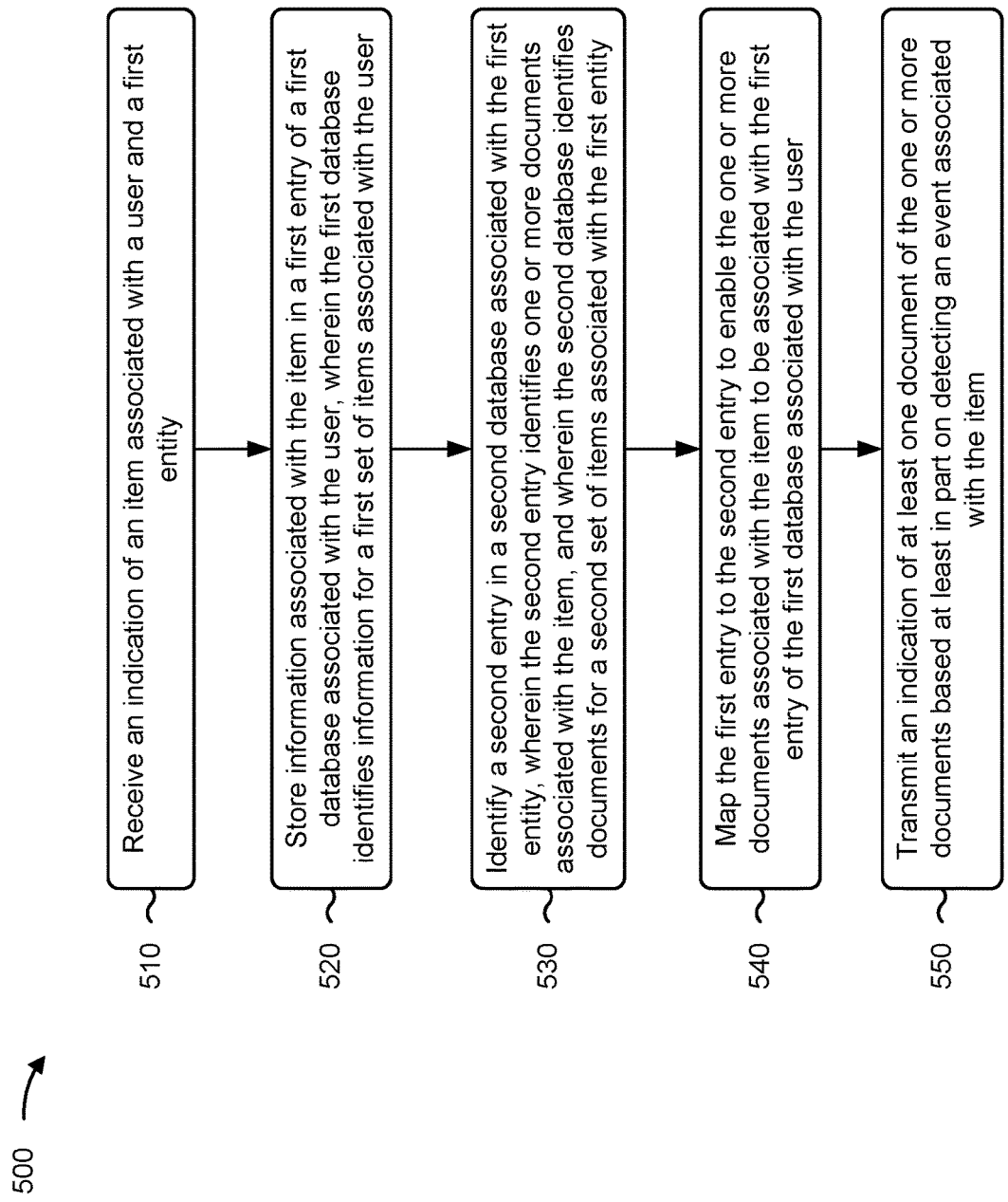
FIG. 5 is a flowchart of an example process relating to database management for digitally storing item information.

FIG. 5 is a flowchart of an example process 500 associated with database management for digitally storing item information. In some implementations, one or more process blocks of FIG. 5 may be performed by a device (e.g., the document management system 360). In some implementations, one or more process blocks of FIG. 5 may be performed by another device or a group of devices separate from or including the device, such as the transaction terminal 310, the transaction device 320, the mobile device 330, the transaction backend system 340, and/or the user device 370. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving an indication of an item associated with a user and a first entity (block 510). As further shown in FIG. 5, process 500 may include storing information associated with the item in a first entry of a first database associated with the user (block 520). In some implementations, the first database identifies information for a first set of items associated with the user. As further shown in FIG. 5, process 500 may include identifying a second entry in a second database associated with the first entity (block 530). In some implementations, the second entry identifies one or more documents associated with the item. In some implementations, the second database identifies documents for a second set of items associated with the first entity. As further shown in FIG. 5, process 500 may include mapping the first entry to the second entry to enable the one or more documents associated with the item to be associated with the first entry of the first database associated with the user (block 540). As further shown in FIG. 5, process 500 may include transmitting an indication of at least one document of the one or more documents based at least in part on detecting an event associated with the item (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A system for database management, the system comprising:
one or more memories; and
one or more processors, coupled to the one or more memories, configured to:
receive an indication of an exchange associated with a user and a selling entity;
store information associated with the exchange in a first block of a first blockchain associated with the user, wherein the first blockchain stores information for a plurality of exchanges associated with the user;
utilize a machine learning model to determine, based at least in part on exchange information associated with the exchange, a set of candidate manufacturing entities associated with the exchange,
wherein the exchange information identifies a set of features associated with determining a manufacturing entity associated with the exchange, and
wherein the one or more processors, when utilizing the machine learning model to determine the set of candidate manufacturing entities, are configured to:
associate the set of candidate manufacturing entities with a target variable; and
input the set of features to the machine learning model to generate an output indicating a value predicted for the target variable;
based on the value predicted for the target variable, cause a first automated action to be performed, wherein the first automated action includes providing information identifying the set of candidate manufacturing entities to a device associated with the user;
receive, based on causing the first automated action to be performed, a response indicating the manufacturing entity associated with exchange;
identify a second block in a second blockchain associated with the manufacturing entity, wherein the second block stores item information associated with an item of a plurality of items associated with the manufacturing entity, and wherein the second blockchain stores information for the plurality of items associated with the manufacturing entity;
map the first block to the second block to enable the item information associated with the item to be associated with the exchange;
detect, subsequent to mapping the first block to the second block, an event associated with the item based at least in part on determining a change to the item information stored in the second block;
determine that the exchange is associated with the item based at least in part on the first block being mapped to the second block;
cause a second automated action to be performed, wherein the second automated action includes transmitting to the device associated with the user, an indication of the change to the item information based at least in part on the exchange being associated with the item; and
store, relative to requiring computing resources to be allocated, the item information based on the set of features.

2. The system of claim 1, wherein the one or more processors are further configured to:
analyze the item information to identify one or more dates associated with the item; and
detect another event based at least in part on the one or more dates.

3. The system of claim 2, wherein the one or more processors are further configured to:
detect the other event based at least in part on at least one of a date, of the one or more dates, or an exchange date associated with the exchange; and
transmit, to the device associated with the user, a notification that the date is approaching and a notification of the item information associated with the item and the date.

4. The system of claim 1, wherein the item information includes at least one of:
a warranty document,
a manual document,
return information, or
an insurance document.

5. The system of claim 1, wherein the one or more processors are further configured to:
map a third block, associated with another item and another exchange of the plurality of exchanges, of the first blockchain to a fourth block of a third blockchain associated with another manufacturing entity, wherein the other manufacturing entity is associated with the other item, and wherein the fourth block identifies other item information associated with the other item.

6. The system of claim 1, wherein the one or more processors, to identify the second block in the second blockchain, are configured to:
search the second blockchain for information indicating the item; and
identify the second block associated with the item based at least in part on searching the second blockchain for the information indicating the item.

7. The system of claim 1, wherein the one or more processors are further configured to:
identify a form associated with the item information stored in the second block of the second blockchain;
identify user information associated with the user stored in the first blockchain;
receive a request to obtain the form; and
automatically input the user information into one or more fields of the form based on receiving the request to obtain the form.

8. A method for database management, comprising:
receiving, by a device, an indication of an item associated with a user and a manufacturing entity;
storing, by the device, information associated with the item in a first block of a first blockchain associated with the user, wherein the first blockchain stores information for a first set of items associated with the user;
utilizing, by the device, a machine learning model to determine a set of candidate manufacturing entities based on a set of features associated with one or more of a time, the user, or the manufacturing entity,
wherein utilizing the machine learning model to determine the set of candidate manufacturing entities includes:
associating the set of candidate manufacturing entities with a target value; and
inputting the set of features to the machine learning model to generate an output indicating a value predicted for a target variable;
causing, by the device and based on the value predicted for the target variable, a first automated action to be performed, wherein the first automated action includes providing information identifying the set of candidate manufacturing entities to a user device associated with the user;

receiving, by the device, information indicating the manufacturing entity based on causing the first automated action to be performed;

identifying, by the device, a second block in a second blockchain associated with the manufacturing entity, wherein the second block stores one or more documents associated with the item, and wherein the second blockchain stores documents for a second set of items associated with the manufacturing entity;

mapping, by the device, the first block to the second block to enable the one or more documents associated with the item to be associated with the first block of the first blockchain associated with the user;

detecting, by the device and subsequent to mapping the first block to the second block, an event associated with the item based at least in part on determining a change to at least one document of the one or more documents stored in the second block;

determining, by the device, that the one or more documents associated with the item are associated with the first block based at least in part on mapping the first block to the second block;

causing, by the device, a second automated action to be performed, wherein the second automated action includes transmitting an indication of the change to the at least one document of the one or more documents based at least in part on the one or more documents being associated with the first block; and storing, relative to requiring computing resources to be allocated, the at least one document based on the set of features.

9. The method of claim 8, further comprising:

analyzing item information to identify one or more dates associated with the item;

detecting another event based at least in part on at least one of a date, of the one or more dates, or an exchange date associated with an exchange associated with the item; and transmitting, to another device associated with the user, a notification that the date is approaching and of the item information.

10. The method of claim 9, wherein the item information includes at least one of:

a warranty document, a manual document, a return document, or an insurance document.

11. The method of claim 9, wherein the other event includes at least one of:

a request from the user, a date associated with a document of the one or more documents, or an update associated with the item information.

12. The method of claim 8, comprising:

searching the second blockchain for information indicating the item; and identifying the second block associated with the item based at least in part on searching the second blockchain for the information indicating the item.

13. The method of claim 8, further comprising:

receiving an indication of an update to the at least one document of the one or more documents, wherein the change to the at least one document is determined based at least in part on receiving the indication of the update to the at least one document.

14. The method of claim 8, further comprising:

receiving an indication that the item has been transferred to a different user, wherein the indication includes an indication of an account associated with the different user;

storing information associated with the item in a third block of a third blockchain associated with the different user, wherein the third block is mapped to the second block in the second blockchain; and transmitting, to a device associated with the different user, an indication of the at least one document of the one or more documents.

15. The method of claim 8, wherein receiving the indication of the item associated with the user and the manufacturing entity comprises:

receiving an indication of an exchange associated with a selling entity; and determining, based at least in part on exchange information associated with the exchange and a database associated with the selling entity, one or more candidate items associated with the exchange; and identifying the item from the one or more candidate items.

16. A non-transitory computer-readable medium storing a set of instructions, the set of instructions comprising:

one or more instructions that, when executed by one or more processors of a device, cause the device to:

receive an indication of an exchange associated with a user and a selling entity, wherein the indication of the exchange includes a set of features associated with one or more of the exchange, the user, or the selling entity;

utilize a machine learning model to determine, based on the set of features, at least one of a candidate manufacturing entity associated with the exchange or a candidate item associated with the exchange, wherein the one or more instructions, that cause the device to utilize the machine learning model to determine the at least one of the candidate manufacturing entity associated with the exchange or the candidate item associated with the exchange, cause the device to:

associate the at least one of the candidate manufacturing entity associated with the exchange or the candidate item associated with the exchange with at least one target value; and input the set of features to the machine learning model to generate at least one output indicating a value predicted for each target value of the at least one target value;

based on the at least one output indicating the value predicted for each target value of the at least one target value, cause a first automated action to be performed, wherein the first automated action includes providing information identifying the at least one of the candidate manufacturing entity or the candidate item to a user device associated with the user;

receive, based on causing the first automated action to be performed, information indicating one or more of:

the candidate manufacturing entity corresponds to a manufacturing entity associated with the exchange, or the candidate item corresponds to an item associated with the exchange;

store information associated with the item in a first block of a first blockchain associated with the user, wherein the first blockchain stores information for a first set of items associated with the user;

identify a second block in a second blockchain associated with the manufacturing entity, wherein the second block stores one or more documents associated with the item, and wherein the second blockchain stores documents for a second set of items associated with the manufacturing entity;

map the first block to the second block to enable the one or more documents associated with the item to be associated with the first blockchain associated with the user;

detect, subsequent to mapping the first block to the second block, an event associated with the item based at least in part on determining a change to at least one document of the one or more documents stored in the second block;

determine that the first blockchain is associated with the item based at least in part on the first block being mapped to the second block;

cause, based at least in part on the first blockchain being associated with the item, a second automated action to be performed, wherein the second automated action includes transmitting an indication of at least one document of the one or more documents; and store, relative to requiring computing resources to be allocated, the indication of the at least one document of the one or more documents based on the set of features.

17. The non-transitory computer-readable medium of claim 16, wherein the one or more instructions further cause the device to:

analyze the one or more documents to identify one or more dates associated with the item;

detect another event based at least in part on at least one of a date, of the one or more dates, or an exchange date associated with the exchange; and transmit, to a device associated with the user, a notification that the date is approaching based at least in part on detecting the other event.

18. The non-transitory computer-readable medium of claim 16, wherein the one or more instructions further cause the device to:

search the second blockchain for information indicating the item; and identify the second block associated with the item based at least in part on searching the second blockchain for the information indicating the item.

19. The non-transitory computer-readable medium of claim 16, wherein the one or more instructions, that cause the device to determine at least one of the manufacturing entity associated with the exchange or the item associated with the exchange, cause the device to:

identify, based at least in part on the indication of the exchange and a database associated with the selling entity, one or more candidate items associated with the exchange, wherein the database identifies entities or items associated with the selling entity;

transmit, to a device associated with the user, an indication of the one or more candidate items; and receive, from the device associated with the user, an indication of the item from the one or more candidate items.

20. The non-transitory computer-readable medium of claim 16, wherein the one or more instructions, that cause the device to determine at least one of the manufacturing entity associated with the exchange or the item associated with the exchange, cause the device to:

determine at least one of the manufacturing entity associated with the exchange or the item associated with the exchange using a machine learning model, wherein an input to the machine learning model includes at least one of:

the indication of the exchange, an amount associated with the exchange, a date associated with the exchange, a time associated with the exchange, a location associated with the exchange, the selling entity, historical exchanges associated with the user, a payment medium associated with the exchange, or user information associated with the user.

* * * * *